(12) United States Patent
Wu et al.

(10) Patent No.: US 8,525,835 B1
(45) Date of Patent: Sep. 3, 2013

(54) SPATIAL DATA COMPRESSION USING IMPLICIT GEOMETRY

(75) Inventors: Yuan-Jye Wu, Issaquah, WA (US);
Dejan Nikic, Seattle, WA (US)

(73) Assignee: The Boeing Company, Chicago, IL (US)

( * ) Notice: Subject to any disclaimer, the term of this patent is extended or adjusted under 35 U.S.C. 154(b) by 573 days.

(21) Appl. No.: 12/711,931

(22) Filed: Feb. 24, 2010

(51) Int. Cl.
*G06T 15/10* (2011.01)

(52) U.S. Cl.
USPC ............................ 345/427; 345/419; 345/555

(58) Field of Classification Search
USPC ............. 345/555, 427; 348/42; 707/999.107
See application file for complete search history.

(56) References Cited

U.S. PATENT DOCUMENTS

| | | | |
|---|---|---|---|
| 5,754,704 A | 5/1998 | Barnsley et al. | |
| 5,905,507 A | 5/1999 | Rossignac et al. | |
| 5,933,193 A | 8/1999 | Niesen | |
| 5,936,669 A | 8/1999 | Niesen | |
| 6,603,470 B1 | 8/2003 | Deering | |
| 7,542,036 B2 | 6/2009 | Museth et al. | |
| 8,179,393 B2 * | 5/2012 | Minear et al. | 345/419 |
| 2005/0243083 A1* | 11/2005 | Frazelle et al. | 345/419 |
| 2006/0294144 A1* | 12/2006 | Shin | 707/999.107 |
| 2009/0196510 A1* | 8/2009 | Gokturk et al. | 382/224 |
| 2010/0225740 A1* | 9/2010 | Jung et al. | 348/42 |
| 2011/0115812 A1* | 5/2011 | Minear et al. | 345/593 |

OTHER PUBLICATIONS

Nikic et al., "Point Cloud Data Clustering and Classification Using Implicit Geometry Representation," USPTO U.S. Appl. No. 13/534,499, filed Jun. 27, 2012, 51 pages.
Zhao et al., "Fast Surface Reconstruction Using the Level Set Method", IEEE/Comput. Soc, Proc. of the first IEEE workshop on "Variational and levelset methods in computer vision", ICCV, 2001, pp. 194-202.
Chan et al., "A Level Set Algorithm for Minimizing the Mumford-Shah Functional in Image Processing", IEEE/Comput. Soc., Proc. of the first IEEE workshop on "Variational and level set methods in computer vision", ICCV, 2001, pp. 161-168.

* cited by examiner

*Primary Examiner* — Phi Hoang
(74) *Attorney, Agent, or Firm* — Yee & Associates, P.C.

(57) ABSTRACT

A plurality of data from a first coordinate system is transformed into a plurality of metadata, each metadata comprising a location identifier and a value summarizing an amount of data points in the first coordinate system associated with a corresponding location in the second coordinate identified by the location identifier. A metadata is formed only when a non-zero value is assigned to a location.

19 Claims, 11 Drawing Sheets

SPATIAL DATA COMPRESSION USING IMPLICIT GEOMETRY

BACKGROUND INFORMATION

1. Field

The present disclosure relates generally to processing data and to a method and apparatus for data compression. Still more particularly, the present disclosure relates to a method and apparatus to reduce an amount of three dimensional data to be stored or transmitted by transforming the three dimensional data from a first coordinate system to a plurality of metadata based on a second coordinate system and configured for one or more applications by one or more attributes in each of the plurality of metadata.

2. Background

Manned and unmanned vehicles may be aerial or ground vehicles. Both manned and unmanned vehicles are used as platforms for devices that gather data. Manned vehicles are normally larger than unmanned vehicles. Therefore, manned vehicles normally are configured to carry more hardware for capturing, storing, and sending data. Unmanned vehicles are advantageous for data gathering for a number of reasons. One of the reasons unmanned vehicles are advantageous for data gathering is that they can operate for long periods of time, and during such long periods of time continuously acquire data. Because the amount of data acquired over a long period of time is large, both storage and transmission of the data use increased amounts of resources in physical storage, transmission bandwidth, and central processing unit time.

One type of data acquired by both manned and unmanned vehicles is three dimensional data from a three dimensional imaging system. An example of a three dimensional imaging system is a light detection and ranging (LIDAR) system that measures distance, speed, rotation, chemical composition and concentration of a remote target. The remote target may be a clearly defined object, such as a vehicle, or a diffuse object such as a smoke plume or cloud. LIDAR imaging systems gather extremely large amounts of data. LIDAR data is known as point cloud data. Point cloud data represents individual points of light reflected from spatial surfaces of objects scanned by the LIDAR imaging system, each individual point of light having a three dimensional coordinate. Because of the amount of data acquired by a platform employing a LIDAR system, challenges arise in both transmission and storage for processing of the data.

Accordingly, it would be advantageous to have a method and apparatus which takes into account one or more of the issues discussed above as well as possibly other issues.

SUMMARY

In an embodiment, a method comprises compressing a plurality of data from a three dimensional imaging device, the method comprising receiving, by a processor, the plurality of data from the three dimensional imaging device, wherein each data in the plurality of data is defined by a three dimensional coordinate in a first coordinate system; associating, by the processor, the first coordinate system with a three dimensional grid in a second coordinate system, the three dimensional grid having a plurality of locations, each of the plurality of locations initially being inactive; responsive to each of the plurality of data, determining, by the processor, a number of non-zero values associated with a number of corresponding locations in the plurality of locations; responsive to determining, by the processor, the number of non-zero values associated with the number of corresponding locations, activating each of the corresponding locations to form a plurality of active locations; forming, by the processor, a plurality of metadata from the plurality of data only for each of the plurality of active locations; and storing the plurality of metadata as a compression of the plurality of data from the three dimensional imaging system.

In an embodiment, a system comprises a computing system connected to a three dimensional imaging device and to a transformer, wherein the three dimensional imaging device is configured to generate a plurality of data defined by a first coordinate system; and wherein the transformer is configured to transform the plurality of data to a plurality of metadata defined by a second coordinate system as a compression of the plurality of data from the three dimensional imaging device.

In an embodiment, a method for compressing data comprises defining an implicit geometry resolution for translating a first plurality of data defined by a three dimensional coordinate system into a second plurality of data defined by a second coordinate system; receiving, by a processor, the plurality of data from a three dimensional imaging device, wherein each data in the plurality of data is defined in the first coordinate system; determining a plurality of location identifiers in the second coordinate system, each of the plurality of location identifiers associated with a location in a three dimensional grid in the second coordinate system, responsive to receiving each of the plurality of data, determining, by the processor, a number of non-zero values associated with a number of corresponding locations in the plurality of locations; responsive to determining, by the processor, the number of non-zero values associated with the number of corresponding locations, activating each of the corresponding locations to form a plurality of active locations; forming, by the processor, a plurality of metadata from the plurality of data only for each of the plurality of active locations; and storing or transmitting the plurality of metadata as a compression of the plurality of data from the three dimensional imaging system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
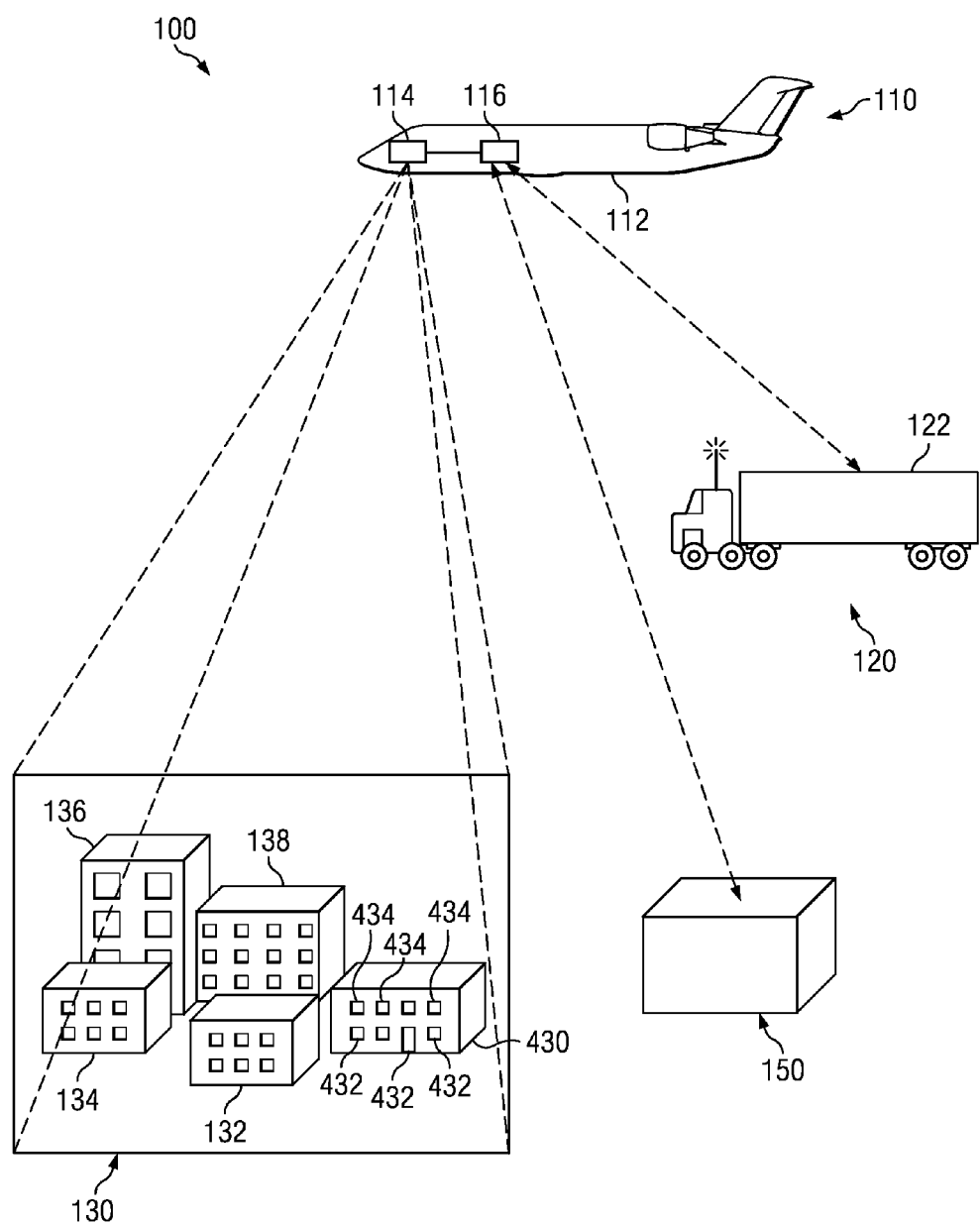
FIG. 1 is an illustration of an imaging environment employing a platform and a station in a first coordinate system in accordance with an advantageous embodiment.

FIG. 1 is an illustration of an imaging environment employing a platform and a station in a first coordinate system. In this example, imaging environment 100 includes platform 110 and receiving station 120. Platform 110 may have imaging device 114 attached to aerial platform 112 for obtaining imaging data of a plurality of objects 130. One type of data acquired by platform 110 may be three dimensional data from a three dimensional imaging system such as a light detection and ranging (LIDAR) system that gathers extremely large amounts of data known as point cloud data. Point cloud data may represent individual points of light reflected from spatial surfaces of objects scanned by the LIDAR imaging system, each individual point of light having a three dimensional coordinate. Point cloud data from imaging device 114 may be stored in storage 116 for further processing.

As depicted, plurality of objects 130 takes the form of buildings 132, 134, 136, 138, and 430 in these illustrative examples. In particular, building 430 may be an object for illustrative purposes for which data is obtained. In an example, building 430 may have openings in a surface such as openings 432 and 434. Openings 432 and 434 may be one of windows and doors. Platform 110 sends the plurality of data to receiving station 120. In the embodiment of FIG. 1, receiving station 120 may be a mobile station such as truck 122. Alternatively, platform 110 may be a stationary location such as alternate station 150, and imaging data obtained by platform 110 may be stored by platform 110 and delivered to alternate station 150 by hand delivery on removable storage 116. Removable storage 116 may be removed from platform 110 upon landing. Alternatively, removable storage 116 may be dropped by parachute or by a glide apparatus for retrieval on the ground and delivery to alternate station 150.

Different advantageous embodiments can be implemented to reduce data sent from platform 110 to receiving station 120 or alternate station 150. The different advantageous embodiments recognize and take into account a number of different considerations. For example, the different advantageous embodiments recognize and take into account that because the amount of data acquired over a long period of time by a manned or an unmanned vehicle is large, both storage and transmission of the data use increased amounts of resources in physical storage, transmission bandwidth, and central processing unit time.

The different advantageous embodiments recognize and take into account that an application's ability to process and use three dimensional data may be delayed by transmission time. Delay in transmission time diminishes the value of the information in the data by separating a second time when the data is analyzed by an application from a first time when the data was acquired. For example, three dimensional data such as LIDAR point cloud data may be used by the military to identify hidden vehicles, personnel, or explosive devices in an area of interest. The value of such information to the military diminishes as the time between acquisition and processing increases. Therefore, the different advantageous embodiments recognize and take into account that reducing an amount of data transmitted can directly affect the utility of the data in real time. The different advantageous embodiments recognize and take into account that a delay in transmission, rendering a display at a time later than a time the data was acquired, degrades the utility of the data.

The different advantageous embodiments recognize and take into account that three dimensional imaging devices are employed on relatively large manned platforms and also on relatively small platforms such as unmanned aerial vehicles (UAVs) and unmanned ground vehicles (UGVs). These small platforms are limited in the amount of onboard storage hardware and transmission hardware that can be carried. The different advantageous embodiments recognize and take into account that both large and small platforms may use data compression to reduce the central processing unit, memory, and storage usage in order to store the large amounts of data gathered by the platforms. The different advantageous embodiments recognize and take into account that a lack of sufficient storage diminishes the capability of the platform to gather data over a long period of time. Therefore, the different advantageous embodiments recognize and take into account that the amount of three dimensional data gathered may be limited by an amount of storage carried by the platform and its attached device.

The different advantageous embodiments recognize and take into account that current general compression techniques for storing and transmitting three dimensional data, such as LIDAR data, use known compression algorithms such as Lempel-Ziv and Arithmetic Coding. These known compression algorithms cannot enable real time or near real time application of the acquired data. Moreover, while these known compression algorithms may provide some increase in storage capacity, such increased storage remains inadequate for many application uses. Therefore, the different advantageous embodiments recognize and take into account that such additional storage usage is subject to the physical limitations of the platforms. Moreover, the different advantageous embodiments recognize and take into account that LIDAR is only one example of three dimensional data gathered by manned and unmanned vehicles.

FIGS. 2-12 illustrate a number of advantageous embodiments wherein a plurality of data from a three dimensional imaging device is compressed. Each data in the plurality of data is defined by a three dimensional coordinate in a first coordinate system. The first coordinate system is associated with a three dimensional grid in a second coordinate system. The three dimensional grid has a plurality of locations. Each of the plurality of locations is inactive initially. Responsive to each of the plurality of data, a number of non-zero values associated with a corresponding location in the plurality of locations are determined. Responsive to determining a non-zero value associated with the corresponding location, the corresponding location is activated. A plurality of metadata is formed from the plurality of data only for each of a plurality of activated locations. The plurality of metadata is stored.

Figure 2:
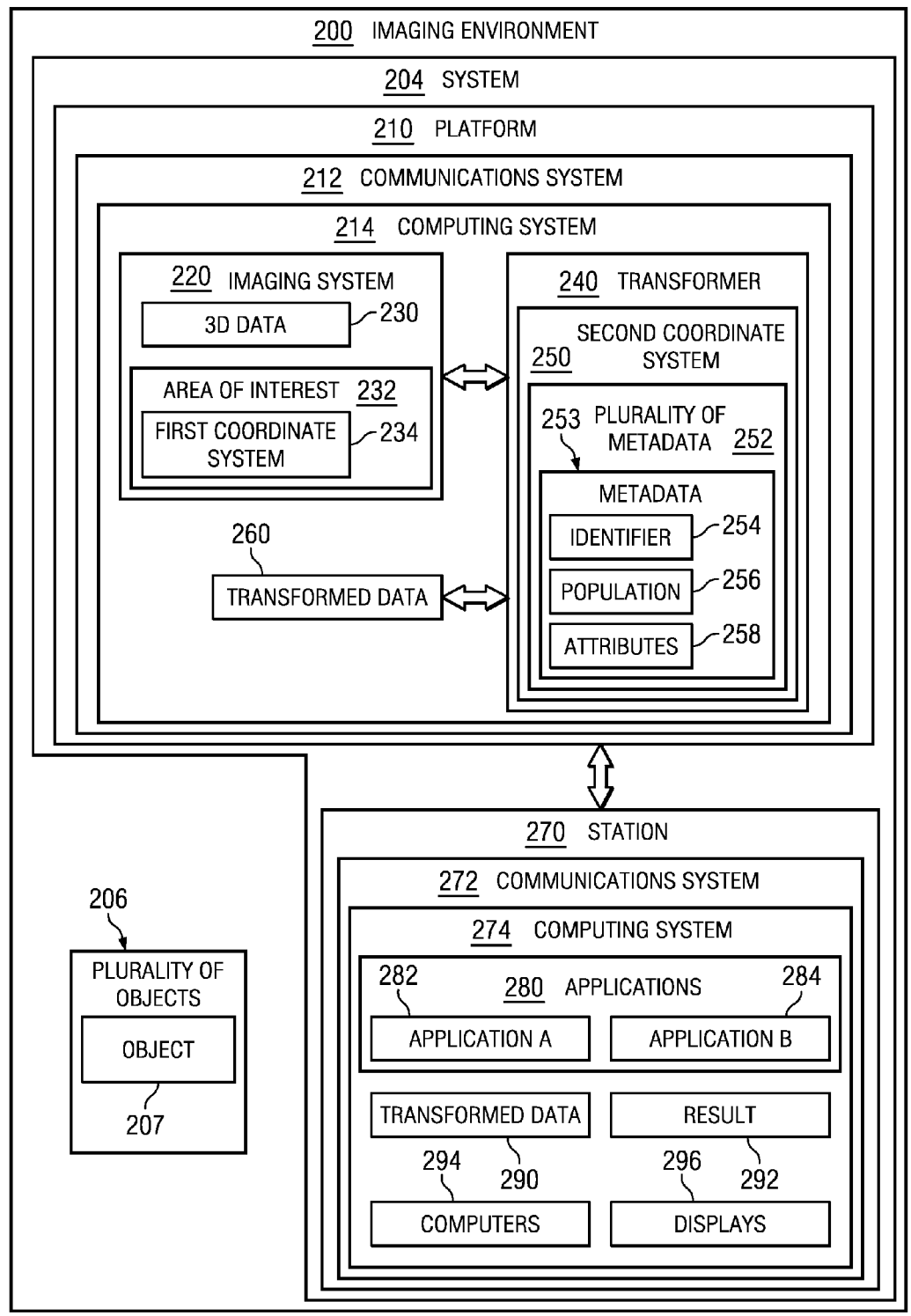
FIG. 2 an illustration of an imaging environment in accordance with an advantageous embodiment.

Turning now to FIG. 2, an illustration of a data processing system is depicted in accordance with an advantageous embodiment. Imaging environment 100 in FIG. 1 is an example of an implementation for imaging environment 200 in FIG. 2. Imaging environment 200 may be a civilian, civil government, or a military environment in which imaging data of a number or objects is desired. Within imaging environment 200, system 204 is employed. System 204 is configured to operate within an environment such as imaging environment 200. System 204 comprises platform 210 and station 270 in these illustrative examples.

In this example, platform 210 may be aerial platform 112 in FIG. 1. Platform 210 may use data compression to reduce central processing unit, memory, and storage usage. Station 270 may be a mobile station such as truck 122 or a fixed installation such as alternate station 150 in FIG. 1.

Platform 210 has communications system 212 for communicating with station 270. Communications system 212 may be any suitable communications system configured for operation in imaging environment 200. Platform 210 has computing system 214. Computing system 214 is a number of computers. "A number of", when referring to items, means one or more items. For example, a number of apparatus embodiments may be one or more apparatus embodiments.

These computers may be in communication with each other and may be any computing system configured to work in conjunction with communications system 212 and with imaging system 220, transformer 240, and transformed data 260.

Imaging system 220 may be any imaging system configured to obtain three dimensional data on a number of objects. Imaging system 220 may be, for example, without limitation, a light detection and ranging (LIDAR) system using point cloud data to represent spatial surfaces of scanned objects. A number of objects may be plurality of objects 206. Object 207 may be an individual object within plurality of objects 206.

Three dimensional data 230 may be stored in computing system 214. The number of objects may be in first coordinate system 234 of area of interest 232. Area of interest 232 may be a portion of the planet within imaging environment 200 identified by geophysical coordinates from a satellite-based system.

First coordinate system 234 may be a three dimensional coordinate system configured to identify a number of data points representing plurality of objects 206 within area of interest 232 of first coordinate system 234. First coordinate system 234 may be configured to assign three dimensional locations to each data acquired by imaging system 220 in accordance with a known reference point. The known reference point may be on the earth or it may be established by a number of satellites.

Transformer 240 is a process and may be implemented using a program code. Transformer 240 is configured to run on a processor of a computer in computing system 214. In these examples, transformer 240 receives three dimensional data 230 from imaging system 220. Each data in the plurality of three dimensional data 230 is defined by a three dimensional coordinate in first coordinate system 234. Transformer 240 associates first coordinate system 234 with a three dimensional grid in second coordinate system 250. Transformer 240 forms a plurality of metadata 252 from the plurality of three dimensional data 230.

As used herein, "metadata" means data describing the three dimensional data in first coordinate system 234. Metadata includes an identifier and a value representing at least one of a population and an attribute. As used herein, "identifier" means a coordinate in a second coordinate system representing a three dimensional grid associated with the first coordinate system. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

Each metadata in plurality of metadata 252 comprises an identifier and a value representing at least one of a value and an attribute. For example, metadata 253 in plurality of metadata 252 comprises identifier 254 and population 256. Population 256 represents a value for a total number of data associated with a particular grid in the three dimensional grid of the second coordinate system 250.

Each metadata may comprise an identifier such as identifier 254, a population such as population 256, and/or a number of attributes 258. When three dimensional data 230 has been transformed by transformer 240 into transformed data 260, and is sent to station 270, transformed data 260 is stored as transformed data 290 in computing system 274. In an embodiment, transformed data 260 is sent to station 270 and stored as transformed data 290. In these examples, transformed data 260 is sent to station 270 after all three-dimensional data 230 data has been transformed.

In another advantageous embodiment, transformed data 260 is sent to station 270 in a stream as portions of three dimensional data 230 are transformed into transformed data 260. In an advantageous embodiment, only metadata with an identifier and a non-zero value for population 256 or a non-zero value for one or more attributes 258 are included in the plurality of metadata 252. In an advantageous embodiment, a number of attributes may be added to the metadata in accordance with a threshold configuration.

Station 270 may have communications system 272 configured to communicate with communications system 212. Communications system 212 receives metadata 253 through communications system 272. Communications system 272 transmits transformed data 260 to computing system 274 for processing by a number of applications such as application A 282 and application B 284. Transformed data 260 of computing system 214 may be stored in transformed data 290 for processing by computing system 274. Computing system 274 has computers 294 and displays 296. After processing by one of applications 280, result 292 may be displayed on one or more displays 296.

Figure 3:
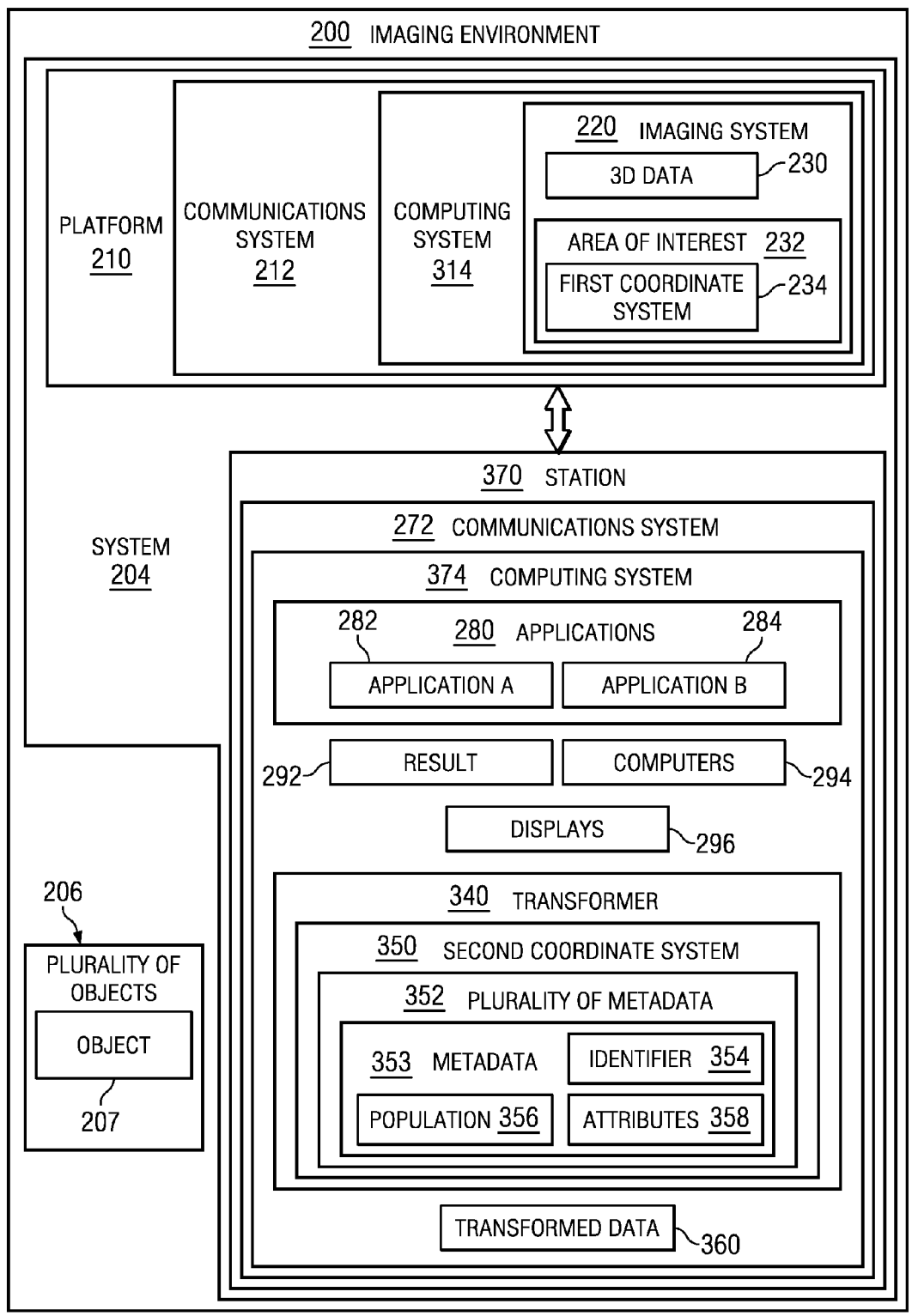
FIG. 3 an illustration of an imaging environment in accordance with an advantageous embodiment.

Turning now to FIG. 3, an illustration of an imaging environment is depicted in accordance with an advantageous embodiment. Imaging environment 100 in FIG. 1 is an example of an implementation for imaging environment 200 in FIG. 2. Imaging environment 200 may be a civilian, civil government, or a military environment in which imaging data of a number or objects is desired. Within imaging environment 200, system 204 is employed. System 204 is configured to operate within an environment such as imaging environment 200. System 204 comprises platform 210 and station 370 in these illustrative examples.

In this example, platform 210 may be aerial platform 112 in FIG. 1. Station 370 may be a mobile station such as truck 122 or a fixed installation such as alternate station 150 in FIG. 1.

Platform 210 has communications system 212 for communicating with station 370. Communications system 212 may be any suitable communications system configured for operation in imaging environment 200. Platform 210 has computing system 314. Computing system 214 is a number of computers. These computers may be in communication with each other and may be any computing system configured to work in conjunction with communications system 212 and with imaging system 220. Imaging system 220 may be any imaging system configured to obtain three dimensional data on a number of objects. A number of objects may be plurality of objects 206. Object 207 may be an individual object within plurality of objects 206.

Imaging system 220 may be, for example, without limitation, a light detection and ranging (LIDAR) system using point cloud data to represent spatial surfaces of scanned objects.

The three dimensional data may be stored in computing system 314 as three dimensional data 230. The number of objects may be in first coordinate system 234 of area of interest 232. Area of interest 232 may be a portion of the planet within imaging environment 200. Area of interest 232 may be identified by geophysical coordinates from a satellite-based system. First coordinate system 234 may be a three dimensional coordinate system configured to identify a number of data points representing an object within the area of interest. First coordinate system 234 may be configured to assign three dimensional locations to each data acquired by imaging system 220 in accordance with a known reference point. The known reference point may be on the earth or it may be established by a number of satellites.

Station 370 may have communications system 272 configured to communicate with communications system 212. Station 370 has computing system 374. Computing system 374 may have applications 280, transformed data 360, result 292, computers 294, displays 296, and transformer 340.

In an advantageous embodiment, three dimensional data 230 is sent to station 370 in a stream as three dimensional data 230 is acquired. In an embodiment, three dimensional data 230 is sent to station 370 after all three dimensional data 230 data has been acquired by platform 210. Communications system 212 may receive three dimensional data 230 through communications system 272. In another advantageous embodiment, three dimensional data 230 is delivered to station 370 in a suitable storage medium after removal from platform 210. Communications system 272 transmits three dimensional data 230 to computing system 374 for transformation by transformer 340 and storage in transformed data 360.

Transformer 340 is a process and may be implemented using a program code configured to run on a processor of a computer in computing system 374. In these examples, transformer 340 receives three dimensional data 230 from platform 210. Transformer 340 forms a plurality of metadata 352 from the plurality of three dimensional data 230. In these examples, transformer 340 receives three dimensional data 330 from imaging system 220. Each data in the plurality of three dimensional data 230 is defined by a three dimensional coordinate in first coordinate system 234. Transformer 240 associates first coordinate system 234 with a three dimensional grid in second coordinate system 350. Transformer 340 forms a plurality of metadata 352 from the plurality of three dimensional data 230.

Each metadata in plurality of metadata 352 comprises an identifier and a number of additional pieces of information. For example, metadata 353 in plurality of metadata 352 comprises identifier 354 and population 356. Population 356 represents a value summarizing the amount of data points in the first coordinate system associated with a corresponding location, identified by a location identifier, in a second coordinate system. In an advantageous embodiment, only metadata with a non-zero value for a population or an attribute are included in the plurality of metadata 352. In another advantageous embodiment, a number of attributes are added to the metadata in accordance with a threshold configuration.

In addition, number of attributes 358 may be included in the metadata. Each metadata may comprise an identifier such as identifier 354, a population such as population 356, and/or a number of attributes 358. When three dimensional data 230 has been transformed by transformer 340 into transformed data 360 at station 370, it is stored as transformed data 360 in computing system 374.

Transformed data 360 may be processed by a number of applications such as application A 282 and application B 284. Computing system 374 has computers 294 and displays 296. After processing by one of applications 280, result 292 may be displayed on one or more displays 296.

The illustrations of imaging environment 200 in FIG. 2 and FIG. 3 are not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

The illustration of imaging environment 200 in FIG. 2 and FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components.

One or more of these blocks may be combined and/or divided into different blocks when implemented in different advantageous embodiments. Platform 210 may be a mobile platform, a stationary platform, a land-based structure, an aquatic-based structure, a space-based structure, an aircraft, a manned aerial vehicle, an unmanned aerial vehicle, a helicopter, a surface ship, an unmanned ground vehicle, a tank, a personnel carrier, train, a spacecraft, a space station, a satellite, a submarine, an automobile, a power plant, a manufacturing facility, and a building. Stations 270 and 370 may be a mobile platform, a stationary platform, a land-based structure, an aquatic-based structure, a space-based structure, an aircraft, a manned aerial vehicle, an unmanned aerial vehicle, a helicopter, a surface ship, a manned ground vehicle, an unmanned ground vehicle, a tank, a personnel carrier, a train, a spacecraft, a space station, a satellite, a submarine, an automobile, a power plant, a manufacturing facility, and a building. Likewise, station 370 may take on other forms as described for station 270, but station 370 is intended to illustrate a station in which the transformer resides for operating on three dimensional data such as 3D data 230 after acquisition and delivery to station 370 so that transformation by transformer 340 and processing by applications 280 both take place at station 370.

Figure 4:
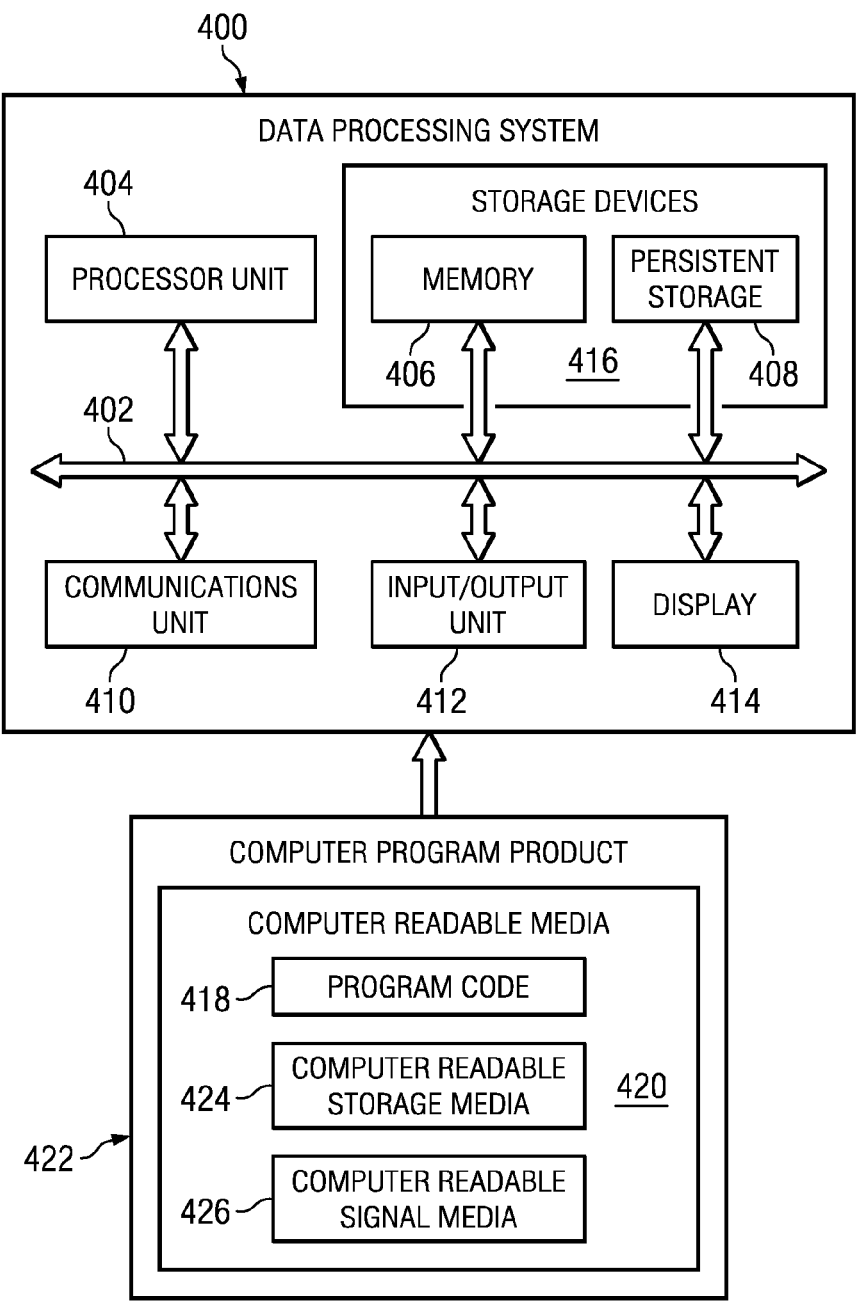
FIG. 4 is an illustration of a computing system in accordance with an advantageous embodiment.

Turning now to FIG. 4, an illustration of a data processing system is depicted in accordance with an advantageous embodiment. Data processing system 400 is an example of a data processing system implemented by computers in imaging device 114 in FIG. 1, computing system 214 and computing system 274 in FIG. 2, and computing system 314 and computing system 374 in FIG. 3. Moreover, transformer 240 in FIG. 2 and transformer 340 in FIG. 3 may comprise instructions stored in a computer readable medium and configured to cause one or more processors of computing systems 214, 274, 314, and 374 to perform a compression of three dimensional data in accordance with one or more of the advantageous embodiments set forth herein. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device may be any piece of hardware capable of storing information such as, for example, without limitation, data, program code in functional form, and/or other suitable information either on a temporary basis and/or a permanent basis. Memory 406, in these examples, may be, for example, a random access memory or any other suitable volatile or non-volatile storage device.

Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 may be a network interface card. Communications unit 410 may provide communications through the use of either or both physical and wireless communications links.

Input/output unit 412 allows for input and output of data with other devices connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer-implemented instructions, which may be located in a memory, such as memory 406.

These instructions are referred to as program code, computer usable program code, or computer readable program code read and executed by a processor in processor unit 404. The program code in the different embodiments may be embodied on different physical or tangible computer readable media, such as memory 406 or persistent storage 408.

Program code 418 may be located in a functional form on computer readable media 420 selectively removable and loaded onto or transferred to data processing system 400 for execution by processor unit 404. Program code 418 and computer readable media 420 form computer program product 422 in these examples. In one example, computer readable media 420 may be in a tangible form such as, for example, an optical or magnetic disk inserted or placed into a drive or other device as part of persistent storage 408 for transfer onto a storage device, such as a hard drive that may be part of persistent storage 408.

In a tangible form, computer readable media 420 also may take the form of a persistent storage, such as a hard drive, a thumb drive, or a flash memory connected to data processing system 400. Computer readable media 420 may further comprise computer readable storage media 424 and computer readable signal media 426. The tangible form of computer readable media 420 may also be referred to as computer recordable storage media. In some instances, computer readable media 420 may not be removable.

Alternatively, program code 418 may be transferred to data processing system 400 from computer readable media 420 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 418 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 418 may be a server computer, a client computer, or some other device configured to store and to transmit program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400.

Other components shown in FIG. 4 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 400 may be any hardware apparatus storing data. Memory 406, persistent storage 408, and computer readable media 420 are examples of storage devices in a tangible form. In another example, a bus system may be used to implement communications fabric 402 and may be comprised of one or more buses, such as a system bus or an input/output bus. Of course, the bus system may be implemented using any suitable type of architecture providing for a transfer of data between different components or devices attached to the bus system.

Additionally, a communications unit may include one or more devices used to transmit and receive data, such as a modem or a network adapter. Further, a memory may be, for example, memory 406 or a cache such as found in an interface and memory controller hub in communications fabric 402.

Figure 5:
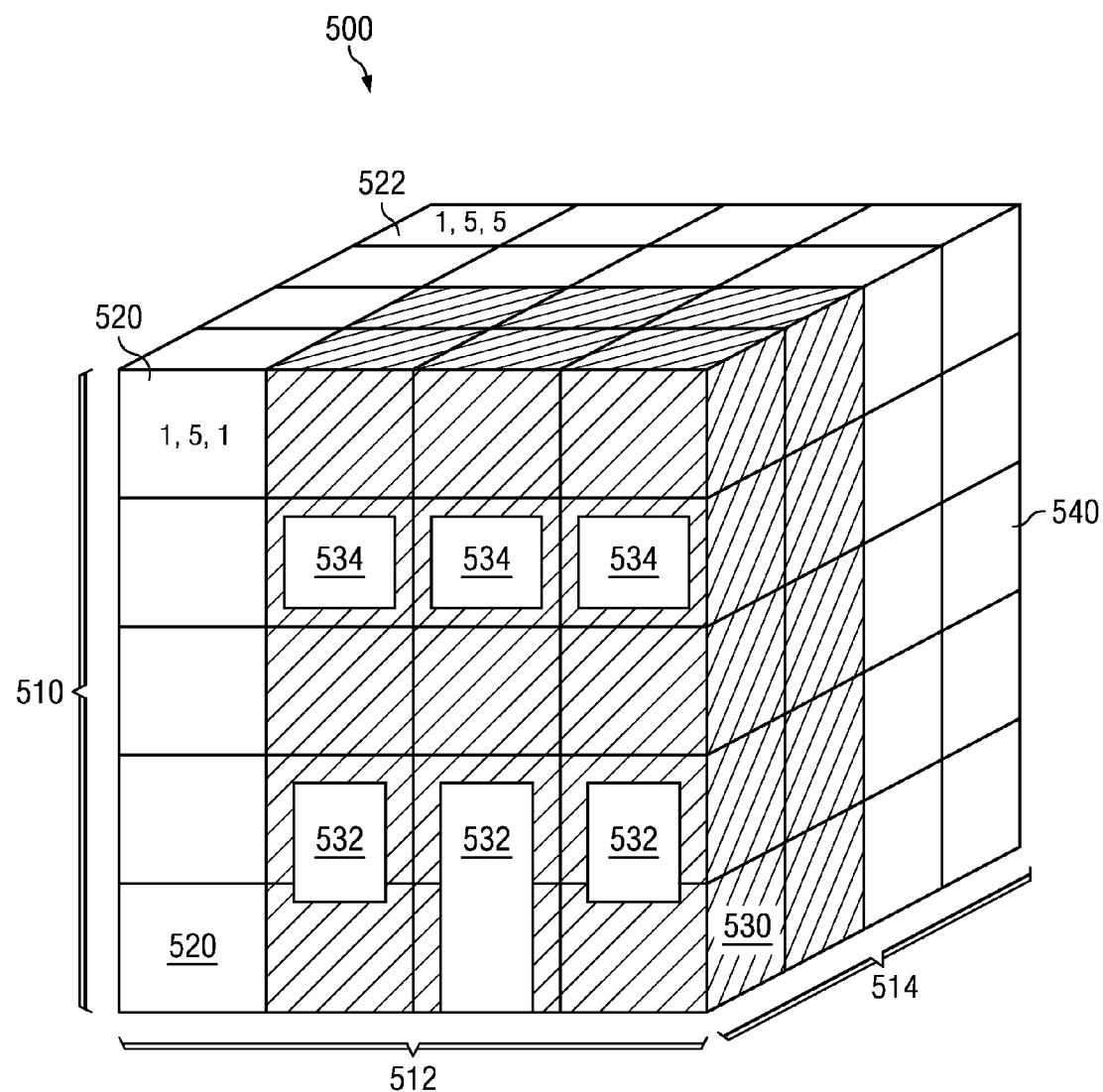
FIG. 5 is an illustration of a second coordinate system in accordance with an advantageous embodiment.

Turning now to FIG. 5, an illustration of a second coordinate system is depicted in accordance with an advantageous embodiment. Second coordinate system 500 is an example of one implementation of second coordinate system 250 in FIG. 2 and second coordinate system 350 in FIG. 3. As depicted, second coordinate system 500 has x axis 512, y axis 510, and z axis 514. Second coordinate system 500 may have a plurality of locations such as location 540.

Each cube making up second coordinate system 500 represents a location in second coordinate system 500. The shaded portion of building 530 represents an object such as building 430 in FIG. 1. Thus, the object representing building 430 of FIG. 1 has been shown, by way of illustration only, and not by way of limitation, with three dimensional grid of second coordinate system superimposed. As a result, building 530 appears divided into a plurality of pieces, each piece represented by a cube in second coordinate system 500. Upper level windows 534, and lower level windows and doors 532 appear in both FIG. 1 and FIG. 5 as open surfaces.

In the example of FIG. 5, thirty cubes are present. Each cube may be identified by a location identifier. For example, cube 520 may be located by location identifier (1,5,1). The numerals (1,5,1) represent the first lateral location, fifth height location, and first depth location. Likewise, cube 522 may be represented by the location identifier (1,5,5), where 1 represents the first lateral location, 5 represents the fifth height location, and 5 represents the fifth depth location.

The foregoing is only by way of example and is not mean to limit the use to the three dimensional coordinate system depicted herein. Persons skilled in the art recognize and will take advantage of other three dimensional coordinate systems. For example, polar coordinates may be used.

Figure 6:
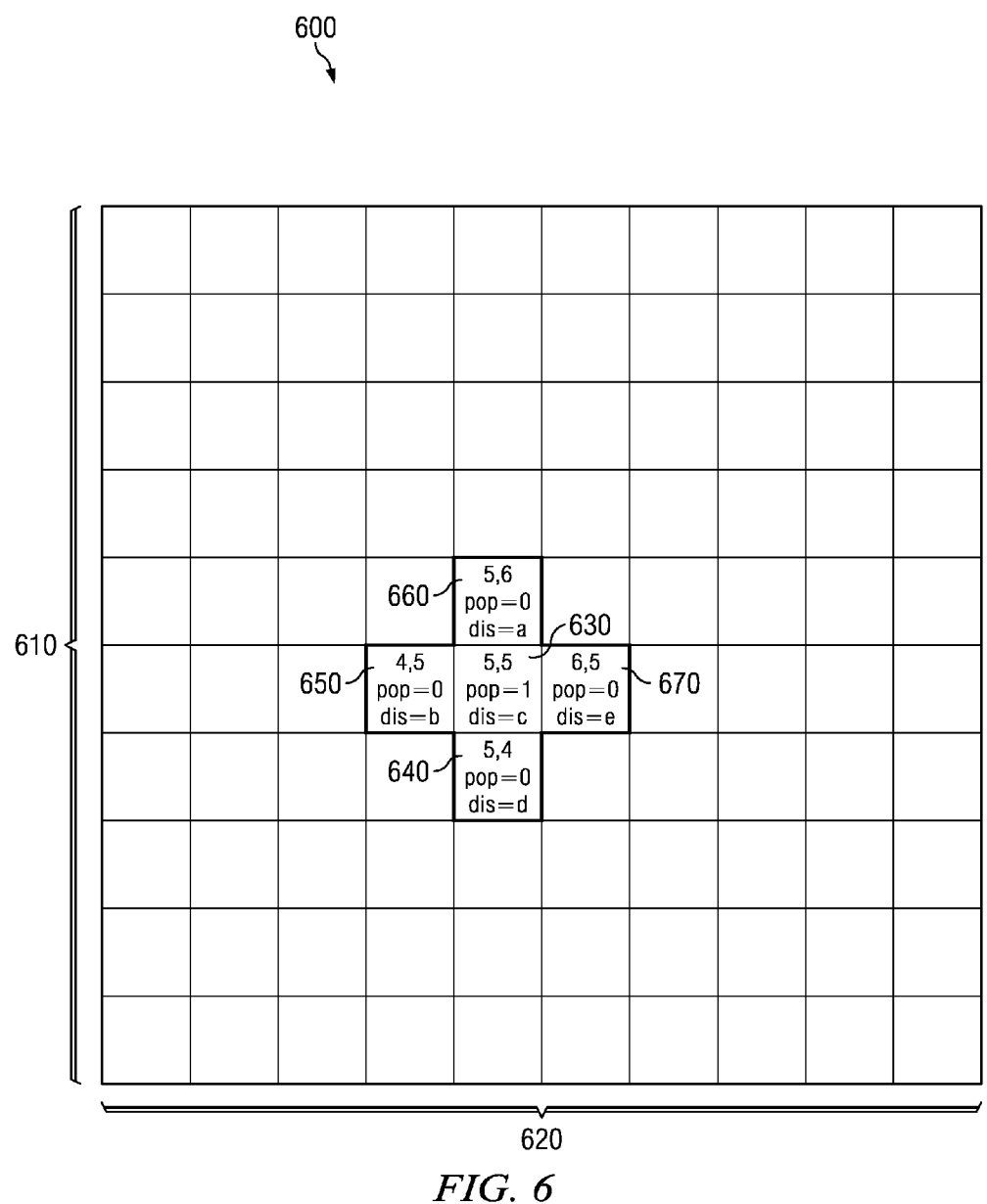
FIG. 6 is an illustration of a two-dimensional cross section of a second coordinate in accordance with an advantageous embodiment.

Turning now to FIG. 6, an illustration of a two-dimensional cross section of a second coordinate system is depicted in accordance with an advantageous embodiment.

Two-dimensional cross section 600 may be a cross section such as a face of a cube in FIG. 5, or may be a further division of a face of a cube in FIG. 5. Two-dimensional cross section 600 has x-axis 620 and y-axis 610. Location 630 represents a location in second coordinate system identified by the numerals (5,5). Location 630 has a population of 1. Having a population of 1 means location 630 has been activated because it has one data corresponding to location (5,5) transformed from the first coordinate system of FIG. 1.

Neighboring locations (4,5) 650, (5,6) 660, (6,5) 670, and (5,4) 640 surround active location (5,5) 630, and since these neighboring locations have not yet had a data associated, their counters read "pop=0". The additional metadata "dis" is an attribute added for a particular application. In this embodiment, an attribute identified by "dis" represents a distance from a data in location (5,5) to a center of a neighboring cell. Therefore, dis=b in location 650 with location identifier (4,5) represents a distance from the data in location 630 to a center of location 650.

Likewise, dis=a in location 660 represents a distance from the data in location 630 to a center of location 660, dis=e in location 670 represents a distance from the data in location 630 to a center of location 670, and dis=d in location 640 represents a distance between the data in location 630 and a center of location 640. For location 630, dis=c represents a distance from the data in location 630 to a center of location 630.

Figure 7:
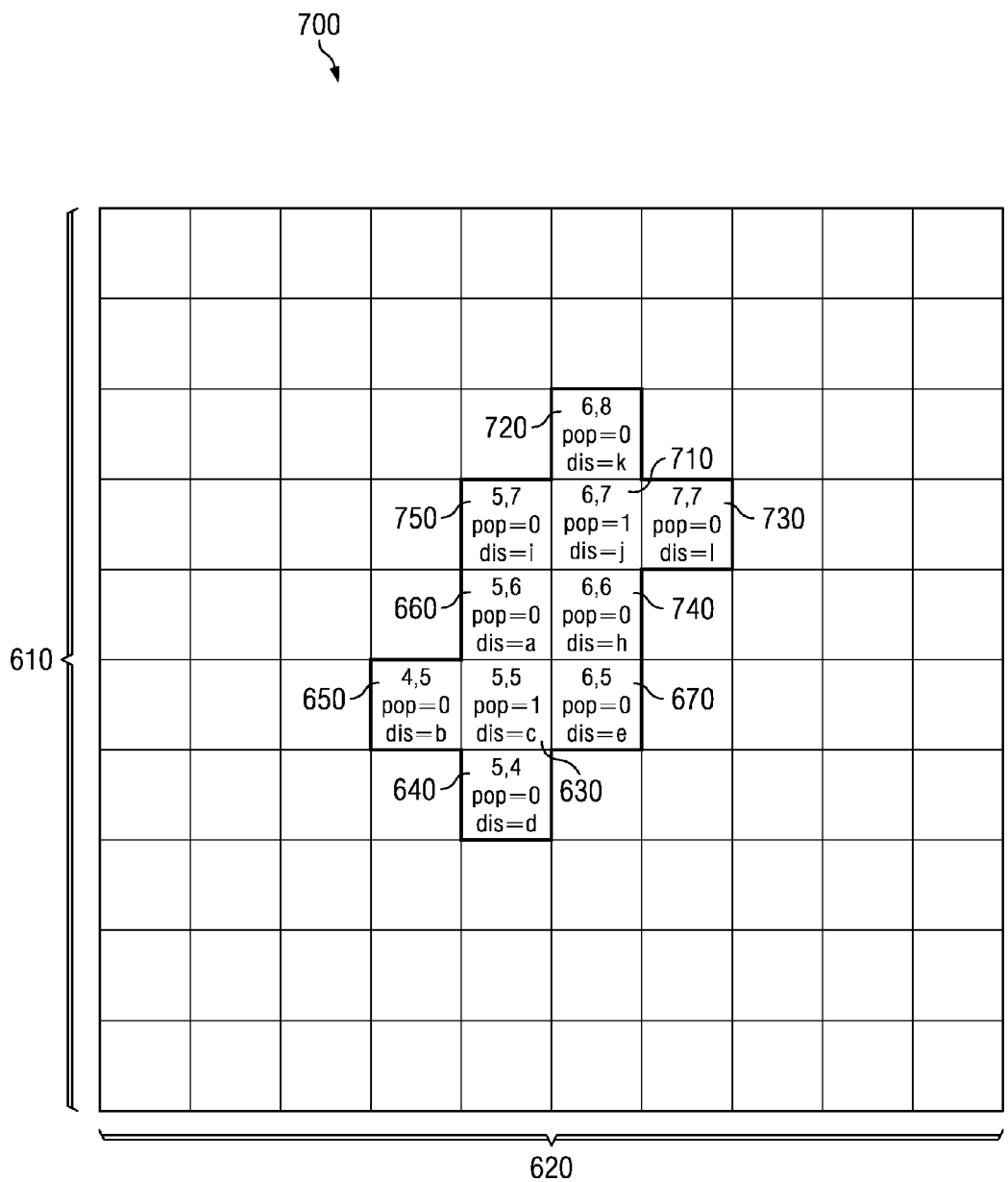
FIG. 7 is an illustration of a two-dimensional cross section of a second coordinate in accordance with an advantageous embodiment.

Turning now to FIG. 7, an illustration of a two-dimensional cross section of a second coordinate system is depicted in accordance with an advantageous embodiment. Two-dimensional cross section 700 may be a cross section such as a face of a cube in FIG. 5, or may be a further division of a face of a cube in FIG. 5. Two-dimensional cross section 700 has x-axis 620 and y-axis 610. Locations 630, 640, 650, 660, and 670 are shown as in FIG. 5. In addition, location 710 has been added. Location 710 has been activated because one data is associated with location 710. Location 710 has location identifier (6,7). Dis=j represents a distance from the data in location 710 to a center of location 710. Location 710's neighboring locations 750, 720, 730, and 740 each have a counter showing pop=0. The values h, i, k, and l represent a distance between a center of the neighboring locations and the data in location 710.

Figure 8:
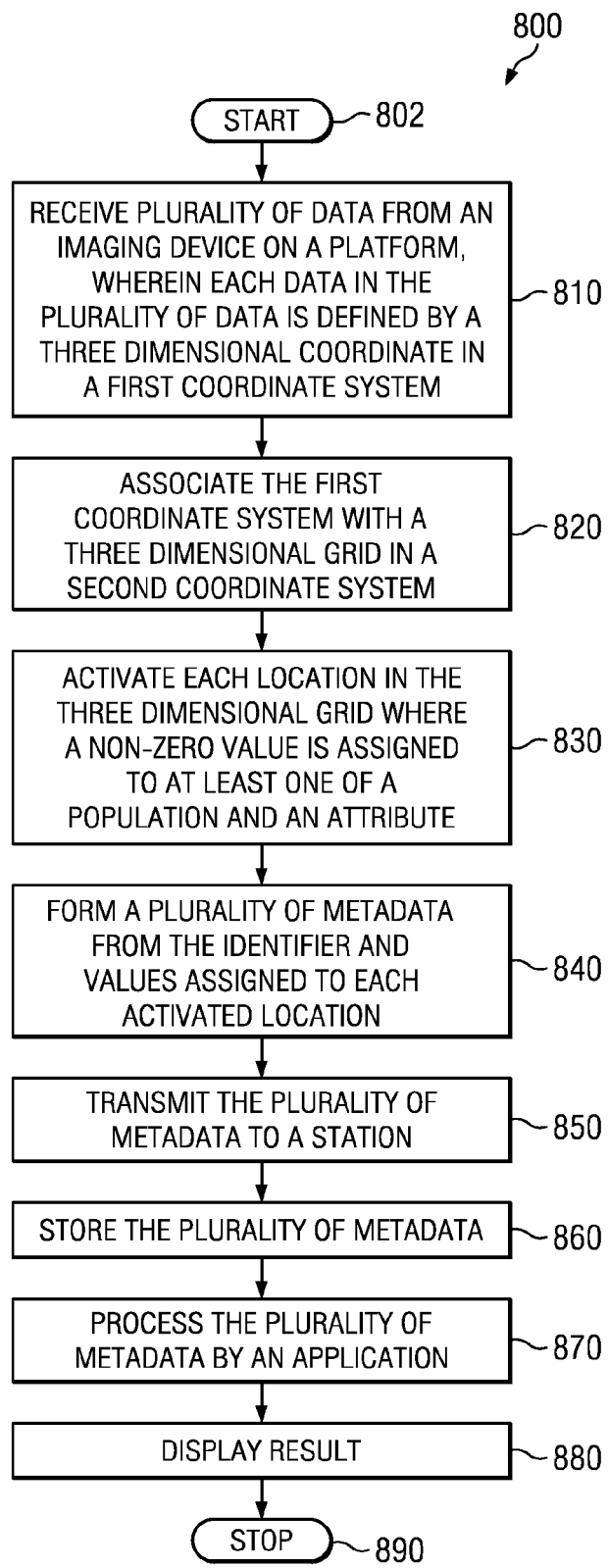
FIG. 8 is an illustration of a flowchart of a process for compressing a plurality of data in a first coordinate system into a plurality of data in a second coordinate system in accordance with an advantageous embodiment.

Turning now to FIG. 8, an illustration of a flowchart of a process for processing a plurality of data is depicted in accordance with an advantageous embodiment. In this example, process 800 may be carried out by transformer 240 in FIG. 2.

Process 800 begins (operation 802). A plurality of data from an imaging device on a platform is received (operation 810). In this example, the plurality of data may be 3D data 230 in FIG. 2. Each data in the plurality of data is defined by a three dimensional coordinate in a first coordinate system. In this example, the first coordinate system may be first coordinate system 234 in FIG. 2. The first coordinate system is associated with a location in a three dimensional grid in a second coordinate system (operation 820). In this example, the second coordinate system may be second coordinate system 250 in FIG. 2. Each location in the three dimensional grid where a non-zero value is assigned to at least one of a population and an attribute is activated (operation 830).

A plurality of metadata is formed from the identifiers and values assigned to each activated location (operation 840). In this example, the plurality of metadata may be plurality of metadata 253 in FIG. 2. In an advantageous embodiment, each metadata in the plurality of metadata comprises a location identifier and a value representing a population of the location. As used herein "population" means a value summarizing the amount of data points in the first coordinate system associated with a corresponding location, identified by a location identifier, in a second coordinate system. In this example, the identifier may be identifier 254 in FIG. 2. In this example, the population may be population 256 in FIG. 2.

In these illustrative examples, only metadata with a non-zero value are included in the plurality of metadata. A cube as in FIG. 5 may be activated because it is identified as having either a data point or an attribute assigned to it. An attribute may be an attribute of attributes 258 in FIG. 2. As additional data points are processed, the values in the activated location may change, but the location will remain active.

When all three dimensional data have been processed, each active location will have an identifier and one or more values assigned. The metadata is transmitted to a station (operation 850). In this example, the station may be station 270 in FIG. 2. Only metadata associated with an active location is transmitted for access by an application configured for processing the plurality of metadata. The metadata is stored at the station (operation 860). In this example, the metadata may be stored in transformed data 290 in FIG. 2. The metadata is accessed by one or more applications configured to process the metadata and is processed (operation 870). In this example, an application may be one of applications 280 in FIG. 2. A result is displayed (operation 880). In this example, the result may be result 292 and the display may be display 296 in FIG. 2. Process 800 stops (operation 890).

Figure 9:
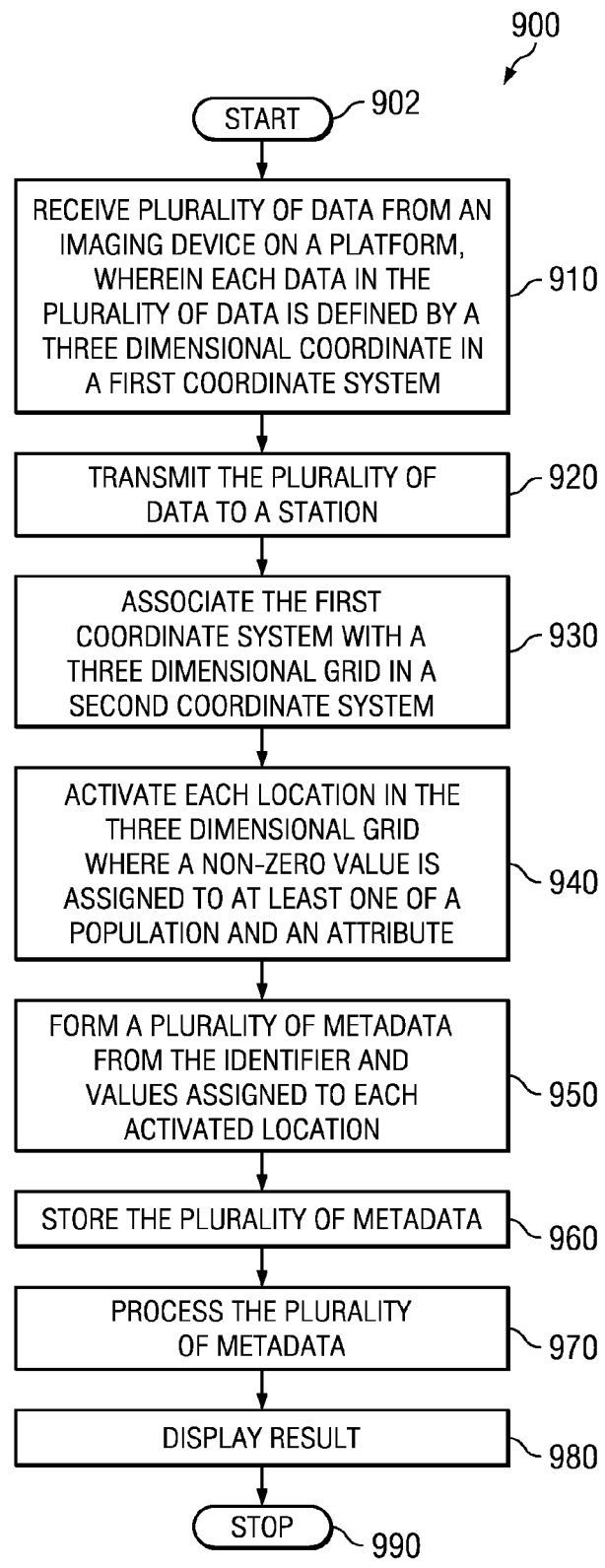
FIG. 9 is an illustration of a flowchart of an alternate process for compressing a plurality of data in a first coordinate system into a plurality of data in a second coordinate system in accordance with an advantageous embodiment.

Turning now to FIG. 9, an illustration of a flowchart of an alternate process for processing a plurality of data is depicted in accordance with an advantageous embodiment. In the example of process 900, transformer 340 is located in station 370 to transform three dimensional data such as 3D data 230 into transformed data 360 at station 370 in FIG. 3.

Process 900 begins (operation 902). A plurality of data from an imaging device on a platform is received (operation 910). In this example, the plurality of data may be 3D data 230 in FIG. 3. Each data in the plurality of data is defined by a three dimensional coordinate in a first coordinate system. In this example, the first coordinate system may be first coordinate system 234 in FIG. 3. The plurality of data is transmitted to a station (operation 920). In this example, the station may be station 370 in FIG. 3. The first coordinate system is associated with a location in a three dimensional grid in a second coordinate system (operation 930). In this example, the second coordinate system may be second coordinate system 350 in FIG. 3. Each location in the three dimensional grid where a non-zero value is assigned to at least one of a population and an attribute is activated (operation 940).

A plurality of metadata is formed from the identifiers and values assigned to each activated location (operation 950). In this example, the plurality of metadata may be plurality of metadata 352 in FIG. 3. In an advantageous embodiment, each metadata in the plurality of metadata comprises a location identifier and a value representing a population of the location. In this example, the location identifier may be identifier 354 in FIG. 3. In this example, the population may be population 356 in FIG. 3. In this example, only metadata with a non-zero value are included in the plurality of metadata. A cube as illustrated in FIG. 5 may be activated because it is identified as having either a data point or an attribute assigned to it. An attribute may be an attribute of attributes 358 in FIG. 3.

As additional data points are processed, the values in the activated location may change, but the location will remain active. When all three dimensional data have been processed, each active location will have an identifier and one or more values assigned. The plurality of metadata is stored (operation 960). In this example, metadata 353 is stored in transformed data 360 in FIG. 3. Only metadata associated with an active location is stored for access by an application configured for processing the plurality of metadata. The plurality of metadata is accessed by one or more applications configured to process the metadata and is processed (operation 970). In an example, an application may be an application from applications 280 in FIG. 3. A result is displayed (operation 980). In an example, the result may be a result from result 292 in FIG. 3. In an example, the display may be a display from displays 296 in FIG. 3. Process 900 stops (operation 990).

Figure 10:
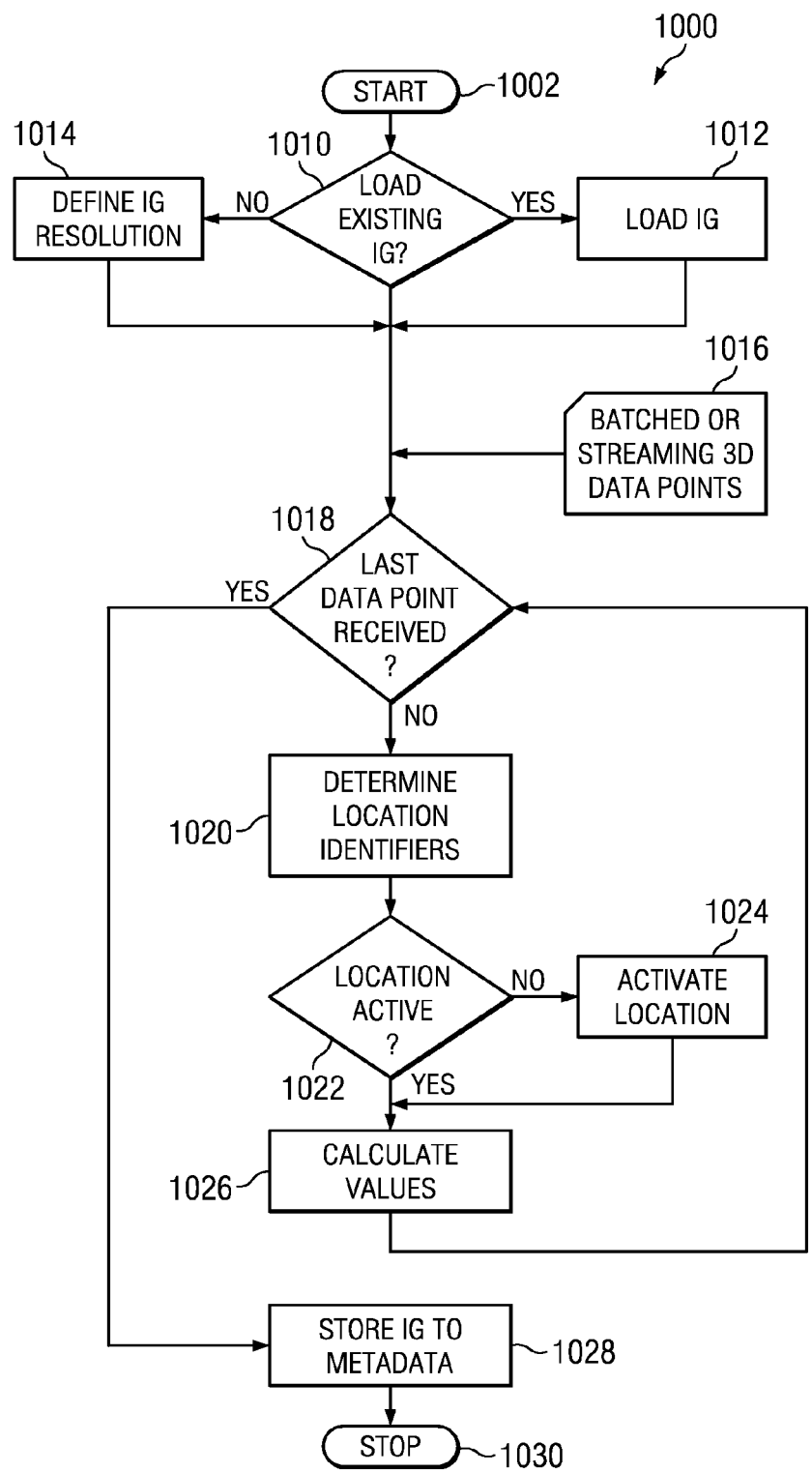
FIG. 10 is an illustration of a flowchart of a process for transforming a plurality of data in a first coordinate system into a plurality of data in a second coordinate system in accordance with an advantageous embodiment.

Turning now to FIG. 10, an illustration of a flowchart of a process for establishing a second coordinate system using implicit geometry is depicted in accordance with an advantageous embodiment. In this example, the process may be carried out by one of transformer 240 in FIG. 2 and transformer 340 in FIG. 3. In this example, the second coordinate system may be one of second coordinate system 250 in FIG. 2 and second coordinate system 350 in FIG. 3. Process 1000 starts (operation 1002). A determination is made whether to load an existing implicit geometry to establish the second coordinate system (operation 1010).

If an existing implicit geometry is to be loaded, the implicit geometry is loaded (operation 1012). If an existing implicit geometry is not to be loaded, then an implicit geometry resolution is defined (operation 1014). Batched or streaming three dimensional data points are received (operation 1016). In this example, the batched or streaming three dimensional data points may be one of 3D data 230 in FIG. 2 and 3D data 230 in FIG. 3. The three dimensional data may be data points, point cloud data points, or some other type of data. A determination is made as to whether the last data point has been received (operation 1018). If so, the data is stored (operation 1028) and process 1000 stops (operation 1030). If the last data point has not been received, location identifiers for the second coordinate system are determined by invoking process 1100 of FIG. 11 (operation 1020).

For each data point, a determination is made whether a location is active (operation 1022). If a location is not active, then a location is activated (operation 1024). If a location is active, then a value is calculated for the metadata representing that location in accordance with process 1200 of FIG. 12 (operation 1026), and process 1000 returns to step 1018 to determine whether the last data point has been processed (operation 1018). When the last data has been reached (operation 1018), the metadata is stored (operation 1028) and process 1000 stops (operation 1030). In this example, the metadata may be stored in one of plurality of metadata 252 in FIG. 2 and plurality of metadata 353 in FIG. 3.

Figure 11:
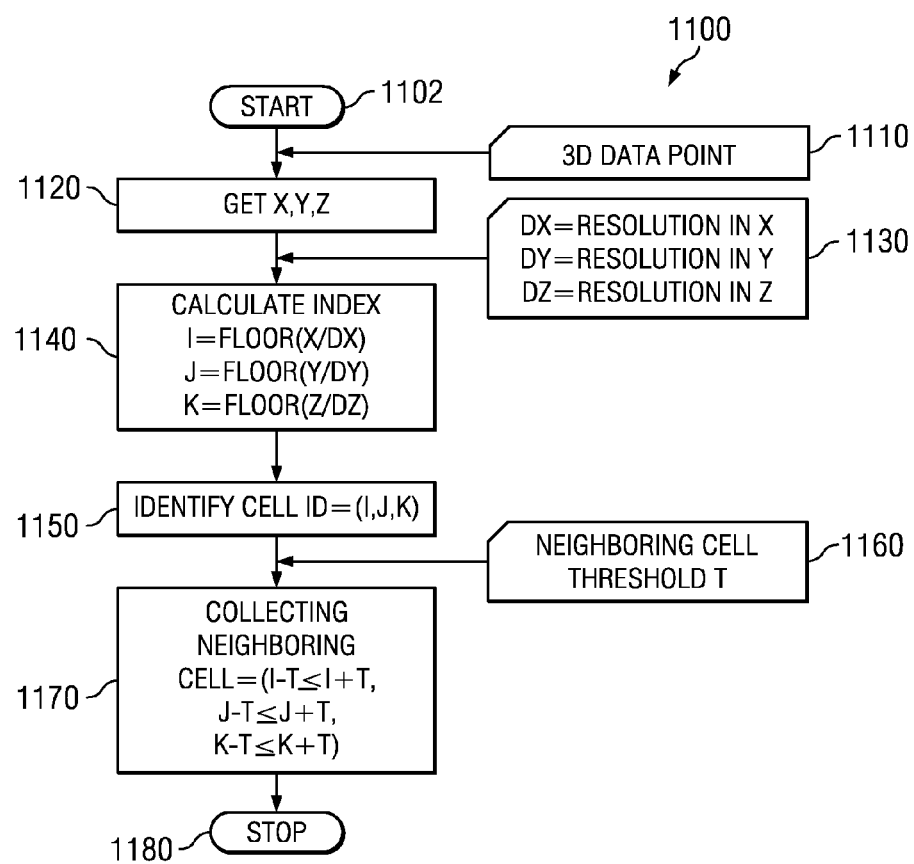
FIG. 11 is an illustration of a flowchart of a process for determining a location identifier for the process of FIG. 10 in accordance with an advantageous embodiment.

Turning now to FIG. 11, an illustration of a flowchart of a process for determining a location identifier for the process of FIG. 10 is depicted in accordance with an advantageous embodiment. The location identifier may be one of identifier 254 in FIG. 2 and identifier 354 in FIG. 3. Process 1100 starts (operation 1102) and three dimensional data point is received (operation 1110). The three dimensional coordinates in the first coordinate system are obtained (operation 1120). In this example, the first coordinate system may be one of first coordinate system 234 in FIG. 2 and first coordinate system 234 in FIG. 3.

The second coordinate system parameters are obtained (operation 1130). In this example, the second coordinate system may be one of second coordinate system 250 in FIG. 2 and second coordinate system 350 in FIG. 3. Coordinates for a location in the second coordinate system are calculated using implicit geometry related to the first coordinate system (operation 1140). In this example, the calculation is performed by one of transformer 240 in FIG. 2 and transformer 340 in FIG. 3. The location identity is specified (operation 1150). In this example, the location identity may be one of identifier 254 in FIG. 2 and identifier 354 in FIG. 3.

A neighboring location threshold is loaded (operation 1160). Neighboring locations are opened where the neighboring location's coordinates are within the threshold (operation 1170). Algorithms to determine neighboring location coordinates may be $I-T \leq I \leq I+T$, $J-T \leq J \leq J+T$, and/or $K-T \leq K \leq K+T$. Process 1100 stops (operation 1180).

Figure 12:
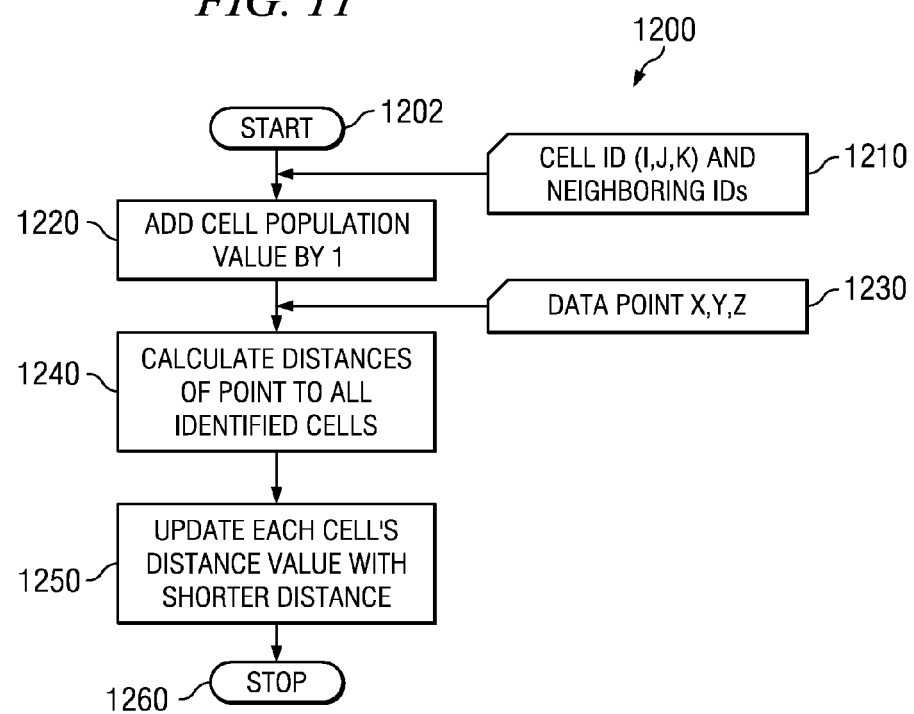
FIG. 12 is an illustration of a flowchart of a process for calculating and updating values for the process of FIG. 10 in accordance with an advantageous embodiment.

Turning now to FIG. 12, an illustration of a flowchart of a process for determining a location identifier for the process of FIG. 10 is depicted in accordance with an advantageous embodiment. Process 1200 starts (operation 1202). Location identifiers and neighboring location identifiers are loaded (operation 1210). Location population is incremented by one (1220). Data coordinates are loaded (operation 1230). Distances are calculated from a data in a location to all identified locations (operation 1240). Each location's distance value is updated with a shorter distance (operation 1250). Process 1200 stops (operation 1260).

In an embodiment, a method for compressing a plurality of data from a three dimensional imaging device, comprises receiving, by a processor, the plurality of data from the three dimensional imaging device, wherein each data in the plurality of data is defined by a three dimensional coordinate in a first coordinate system; associating, by the processor, the first coordinate system with a three dimensional grid in a second coordinate system, the three dimensional grid having a plurality of locations, each of the plurality of locations initially being inactive; responsive to each of the plurality of data, determining, by the processor, a number of non-zero values associated with a number of corresponding locations in the plurality of locations; responsive to determining, by the processor, the number of non-zero values associated with the number of corresponding locations, activating each of the corresponding locations to form a plurality of active locations; forming, by the processor, a plurality of metadata from the plurality of data only for each of the plurality of active locations; and storing the plurality of metadata as a compression of the plurality of data from the three dimensional imaging system.

In an embodiment, the method further comprises receiving, by the processor, the plurality of data from the three dimensional imaging device at one of a platform and a station and forming, by the processor, the plurality of metadata, at one of the platform and the station.

In an embodiment, the method further comprises wherein the platform and the station are each one of a mobile platform, a stationary platform, a land-based structure, an aquatic-based structure, a space-based structure, an aircraft, a manned aerial vehicle, an unmanned aerial vehicle, a helicopter, a surface ship, an unmanned ground vehicle, a tank, a personnel carrier, a train, a spacecraft, a space station, a satellite, a submarine, an automobile, a power plant, a manufacturing facility, and a building.

In an embodiment, forming, by the processor, the plurality of metadata further comprises: providing a unique location identifier for each of the plurality of activated locations.

In an embodiment, the method further comprises transmitting each of the plurality of metadata to a computing system having an application configured for processing the plurality of metadata in accordance with a purpose of the application.

In an embodiment, the method further comprises designating each location that is not associated with a non-zero value as an inactive location; responsive to receiving a data corresponding to an inactive location, converting the inactive location to an active location; and responsive to converting the inactive location to the active location, assigning a location identifier and a value.

In an embodiment, the method further comprises responsive to receiving an additional data corresponding to a new inactive location, converting the new inactive location to a new active location; and responsive to receiving the additional data corresponding to the new active location, updating the value.

In an embodiment, the method further comprises reducing a first size of the plurality of data from the three dimensional imaging data to a second size of the plurality of metadata; wherein the second size is in a range from approximately five percent to fifty percent of the first size; wherein each of the plurality of metadata comprises a location identifier and a numerical value summarizing the amount of data points in the first coordinate system associated with a location in the second coordinate system; and wherein any location not having a non-zero value associated with it is not stored or transmitted.

In an embodiment, the method further comprises adding an attribute to the metadata, wherein each attribute represents an information used by an application.

In an embodiment, the method further comprises: determining a threshold; using the threshold, identifying a plurality of neighboring locations to an active location, wherein a neighboring location is a location having a first center point less than the threshold from a second center point of the active location; assigning a value to an attribute; activating the plurality of neighboring locations; generating a neighboring metadata comprising a neighboring identifier and an attribute location; and transmitting each neighboring metadata with the plurality of metadata.

In an embodiment, the method further comprises responsive to activating a location, determining a plurality of distances, each distance representing a line from the data to a center point of the location and to each neighboring location's center point; determining a shortest distance of the plurality of distances; assigning the shortest distance to the location as the attribute; and updating the attribute in all neighboring locations.

In an embodiment, a system comprises a computing system connected to a three dimensional imaging device and to a transformer; wherein the imaging device is configured to generate a plurality of data defined by a first coordinate system; and wherein the transformer is configured to transform the plurality of data to a plurality of metadata defined by a second coordinate system as a compression of the plurality of data from the three dimensional imaging device.

In an embodiment, the system further comprises a number of applications configured to receive the plurality of metadata, to process the plurality of metadata, and to display a number of results on a number of displays.

In an embodiment, the system further comprises wherein the transformer calculates, for each location in the second coordinate system, a value summarizing the amount of data points in the first coordinate system associated with a corresponding location in the second coordinate system; wherein each metadata in the plurality of metadata comprises a location identifier and a corresponding value; and wherein only metadata with a non-zero value are included in the plurality of metadata.

In an embodiment, the system further comprises wherein when the transformer receives a data corresponding to an empty location, the transformer converts the empty location to an active location; and wherein when the transformer converts the empty location to the active location, the transformer assigns a location identifier and initializes a value for a population to a non-zero value.

In an embodiment, the system further comprises wherein when the transformer receives an additional data corresponding to a new empty location, the transformer converts the new empty location to a new active location; wherein when the transformer receives an additional data corresponding to the active location, the transformer updates the value for the population; and wherein the transformer adds an attribute to the metadata, wherein each attribute represents an information used by a particular application.

In an embodiment, the system further comprises wherein the transformer determines a threshold, and uses the threshold to identify a plurality of neighboring locations to an active location, wherein a neighboring location is a location having a first center point less than the threshold from a second center point of the active location; wherein the transformer generates a neighboring metadata comprising a neighboring identifier and a neighboring attribute location; and wherein the first communications system transmits each neighboring metadata with the plurality of metadata.

In an embodiment, the system further comprises wherein when the transformer activates a location, determines a plurality of distances, each distance representing a line from the data to a center point of the location and to each neighboring location's center point, determines a shortest distance of the plurality of distances, adds the shortest distance to the location as the attribute, and updates the attribute in all neighboring locations.

In an embodiment, a method for compressing data, comprises defining an implicit geometry resolution for translating a first plurality of data defined by a three dimensional coordinate system into a second plurality of data defined by a second coordinate system; receiving, by a processor, the plurality of data from a three dimensional imaging device, wherein each data in the plurality of data is defined in the first coordinate system; determining a plurality of location identifiers in the second coordinate system, each of the plurality of location identifiers associated with a location in a three dimensional grid in the second coordinate system, responsive to receiving each of the plurality of data, determining, by the processor, a number of non-zero values associated with a number of corresponding locations in the plurality of locations; responsive to determining, by the processor, the number of non-zero values associated with the number of corresponding locations, activating each of the corresponding locations to form a plurality of active locations; forming, by the processor, a plurality of metadata from the plurality of data only for each of the plurality of active locations; and storing or transmitting the plurality of metadata as a compression of the plurality of data from the three dimensional imaging system.

In an embodiment, the method further comprises determining a threshold; using the threshold to identify a plurality of neighboring locations to an active location, wherein a neighboring location is a location having a first center point less than the threshold from a second center point of the active location; generating a neighboring metadata comprising a neighboring identifier and a neighboring attribute location; and storing or transmitting each neighboring metadata with the plurality of metadata.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system executing instructions. For the purposes of this disclosure, a computer-usable or computer readable medium can generally be any tangible apparatus containing, storing, communicating, propagating, or transporting the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for compressing a plurality of data from a three dimensional imaging device, the method comprising:
receiving, by a processor, the plurality of data from the three dimensional imaging device, wherein each data in the plurality of data is defined by a three dimensional coordinate in a first coordinate system;
associating, by the processor, the first coordinate system with a three dimensional grid in a second coordinate system, the three dimensional grid having a plurality of locations, each of the plurality of locations initially being inactive;

responsive to each of the plurality of data, determining, by the processor, a number of non-zero values associated with a number of corresponding locations in the plurality of locations;

responsive to determining, by the processor, the number of non-zero values associated with the number of corresponding locations, activating each of the corresponding locations to form a plurality of active locations;

forming, by the processor, a plurality of metadata from the plurality of data only for each of the plurality of active locations; and storing the plurality of metadata as a compression of the plurality of data from the three dimensional imaging system.

2. The method of claim 1, wherein receiving, by the processor, the plurality of data from the three dimensional imaging device takes place at one of a platform and a station and forming, by the processor, the plurality of metadata, takes place at one of the platform_and the station.

3. The method of claim 1, wherein the imaging device comprises a platform configured to send the plurality of data to a station, the platform and the station are each one of a mobile platform, a stationary platform, a land-based structure, an aquatic-based structure, a space-based structure, an aircraft, a manned aerial vehicle, an unmanned aerial vehicle, a helicopter, a surface ship, an unmanned ground vehicle, a tank, a personnel carrier, a train, a spacecraft, a space station, a satellite, a submarine, an automobile, a power plant, a manufacturing facility, and a building.

4. The method of claim 1, wherein forming, by the processor, the plurality of metadata further comprises:
providing a unique location identifier for each of the plurality of activated locations.

5. The method of claim 1 further comprising:
transmitting each of the plurality of metadata to a computing system having an application configured for processing the plurality of metadata in accordance with a purpose of the application.

6. The method of claim 1 further comprising:
designating each location that is not associated with a non-zero value as an inactive location;
responsive to receiving a data corresponding to an inactive location, converting the inactive location to an active location; and
responsive to converting the inactive location to the active location, assigning a location identifier and a value.

7. The method of claim 6 further comprising:
responsive to receiving an additional data corresponding to a new inactive location, converting the new inactive location to a new active location; and
responsive to receiving the additional data corresponding to the new active location, updating the value.

8. The method of claim 7 further comprising:
determining a threshold;
using the threshold, identifying a plurality of neighboring locations to an active location, wherein a neighboring location is a location having a first center point less than the threshold from a second center point of the active location;
assigning a value to an attribute;
activating the plurality of neighboring locations;
generating a neighboring metadata comprising a neighboring identifier and an attribute location; and
transmitting each neighboring metadata with the plurality of metadata.

9. The method of claim 8 further comprising:
responsive to activating a location, determining a plurality of distances, each distance representing a line from the data to a center point of the location and to each neighboring location's center point;
determining a shortest distance of the plurality of distances;
assigning the shortest distance to the location as the attribute; and
updating the attribute in all neighboring locations.

10. The method of claim 1 further comprising:
reducing a first size of the plurality of data from the three dimensional imaging data to a second size of the plurality of metadata;
wherein the second size is in a range from about five percent to fifty percent of the first size;
wherein each of the plurality of metadata comprises a location identifier and a numerical value summarizing the amount of data points in the first coordinate system associated with a corresponding location in the second coordinate system; and
wherein any location not having a non-zero value associated with it is not stored or transmitted.

11. The method of claim 1 further comprising:
adding an attribute to the metadata, wherein each attribute represents an information used by an application.

12. A system, comprising:
a computing system connected to a three dimensional imaging device and to a transformer;
wherein the three dimensional imaging device is configured to generate a plurality of data defined by a first coordinate system; and
wherein the transformer is configured to transform the plurality of data to a plurality of metadata defined by a second coordinate system as a compression of the plurality of data from the three dimensional imaging device, such that when the transformer activates a location in the second coordinate system, the transformer determines a plurality of distances, each distance in the plurality of distances representing a line from the data to a center point of the location and to each neighboring location's center point, then determines a shortest distance of the plurality of distances, and adds the shortest distance to the location as an attribute, and updates the attribute in all neighboring locations.

13. The system of claim 12 further comprising:
a number of applications configured to receive the plurality of metadata, to process the plurality of metadata, and to display a number of results on a number of displays.

14. The system of claim 12 further comprising:
wherein the transformer calculates, for each location in the second coordinate system, a value summarizing an amount of data points in the first coordinate system associated with a corresponding location in the second coordinate system;
wherein each metadata in the plurality of metadata comprises a location identifier and a corresponding value; and
wherein only metadata with a non-zero value are included in the plurality of metadata.

15. The system of claim 12 further comprising:
wherein when the transformer receives a data corresponding to an empty location, the transformer converts the empty location to an active location; and
wherein when the transformer converts the empty location to the active location, the transformer assigns a location identifier and initializes a value for a population to a non-zero value.

16. The system of claim 15 further comprising:
wherein when the transformer receives an additional data corresponding to a new empty location, the transformer converts the new empty location to a new active location;
wherein when the transformer receives an additional data corresponding to the active location, the transformer updates the value for the population; and
wherein the transformer adds another attribute to the metadata, wherein each attribute represents an information used by a particular application.

17. The system of claim 12 further comprising:
wherein the transformer determines a threshold, and uses the threshold to identify a plurality of neighboring locations to an active location, wherein a neighboring location is a cube comprising a second coordinate system, the cube having a first center point less than the threshold from a second center point of the active location;
wherein the transformer generates a neighboring metadata comprising a neighboring identifier and a neighboring attribute location; and
wherein a first communications system transmits each neighboring metadata with the plurality of metadata.

18. A method for compressing data, the method comprising:
defining an implicit geometry resolution for translating a first plurality of data defined by a three dimensional coordinate system into a second plurality of data defined by a second coordinate system;
receiving, by a processor, the plurality of data from a three dimensional imaging device, wherein each data in the plurality of data is defined in a first coordinate system;
determining a plurality of location identifiers in the second coordinate system, each of the plurality of location identifiers associated with a location in a three dimensional grid in the second coordinate system; responsive to receiving each of the plurality of data, determining, by the processor, a number of non-zero values associated with a number of corresponding locations in the plurality of locations;
responsive to determining, by the processor, the number of non-zero values associated with the number of corresponding locations, activating each of the corresponding locations to form a plurality of active locations;
forming, by the processor, a plurality of metadata from the plurality of data only for each of the plurality of active locations; and
storing or transmitting the plurality of metadata as a compression of the plurality of data from the three dimensional imaging system.

19. The method of claim 18 further comprising:
determining a threshold;
using the threshold to identify a plurality of neighboring locations to an active location, wherein a neighboring location is a particular cube comprising the second coordinate system, the particular cube having a first center point less than the threshold from a second center point of the active location;
generating a neighboring metadata comprising a neighboring identifier and a neighboring attribute location; and
storing or transmitting each neighboring metadata with the plurality of metadata.

* * * * *